April 29, 1952 A. RAPPL 2,594,494
CONVERTIBLE TOP MECHANISM
Filed Feb. 12, 1948

INVENTOR
Anton Rappl
BY
Beau, Brooks, Buckley & Beau.
ATTORNEYS

Patented Apr. 29, 1952

2,594,494

UNITED STATES PATENT OFFICE 2,594,494

CONVERTIBLE TOP MECHANISM

Anton Rappl, Eggertsville, N. Y., assignor to Trico Products Corporation, Buffalo, N. Y.

Application February 12, 1948, Serial No. 7,940

5 Claims. (Cl. 296—117)

1

This invention relates to the convertible type of automobile wherein a collapsible top is extensible to an operative position for attachment to the windshield and is folded therefrom into a compact unit to the rear of the passenger compartment.

The primary object of the invention is to facilitate the top adjustment and to enable an expeditious folding of the top structure in a practical and safe manner.

Further, the invention will be found to reside in an improved top raising and lowering mechanism which is of simple construction and efficient in operation.

Figure 1:
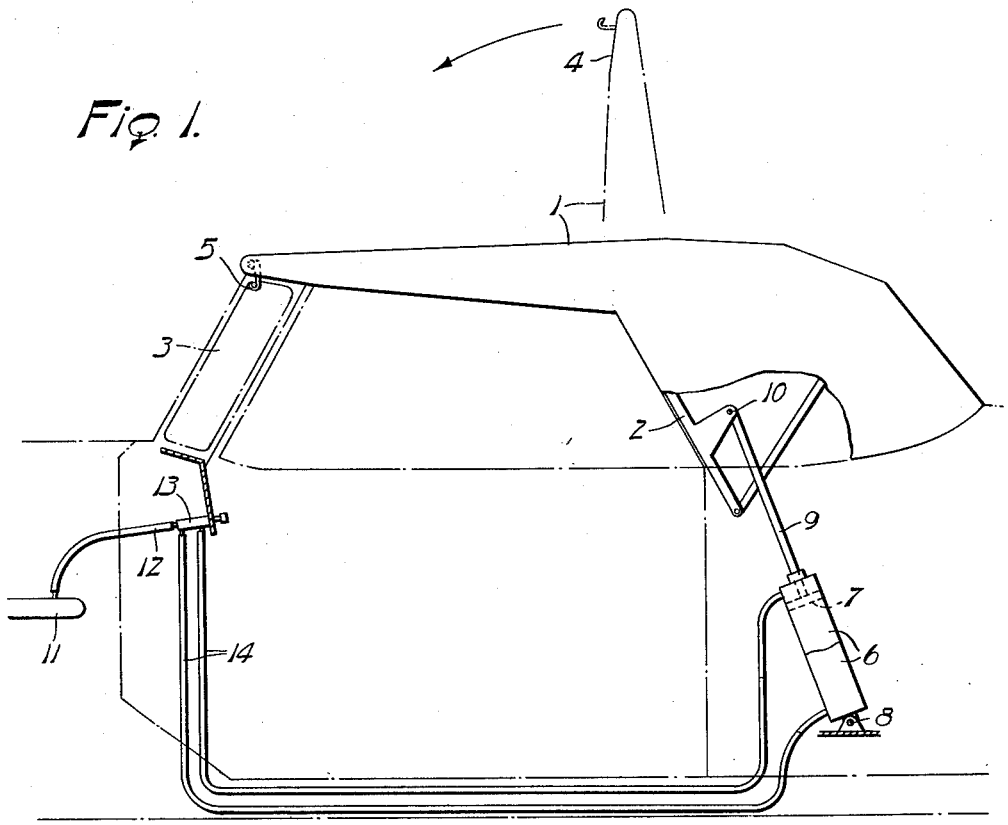
Figure 2:
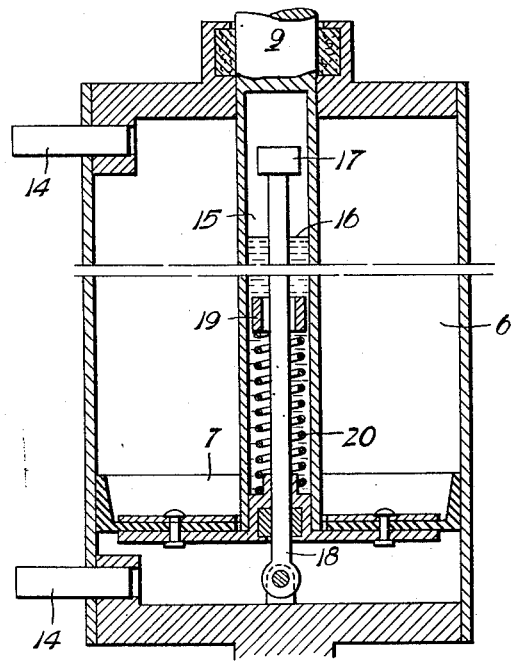

The foregoing and other objects and aims will manifest themselves as the description continues, reference being made to the accompanying drawing wherein Fig. 1 is a schematic layout of the invention on an automobile; and Fig. 2 is a view in longitudinal section through the motor of the adjusting mechanism.

Referring more particularly to the drawing, the numeral 1 designates the collapsible top structure composed of interconnected bars and linkages so arranged under the control of a main lever 2, at each side of the vehicle, that upward swinging of the lever will extend the structure over to the windshield 3, and downward swinging of the lever will fold the structure into a compact assemblage behind the vehicle seat or seats. During its extension the forward portion of the top moves upwardly in an arc to a position approximately that indicated at 4 from which it swings down upon the top rail of windshield frame where it is secured by fastening means 5. This final movement is accelerated somewhat through the leverage afforded by the interconnected parts of the top structure and at times will result in the forward top portion coming down upon the windshield with a violent impact. This is accentuated to a greater degree when the power means employed for extending the top is a pneumatic motor which latter has the advantage of effecting rapid top adjustment to and from an operative position.

A pneumatic motor of this character, which is arranged on each side of the vehicle for acting on a respective one of the side levers 2, is herein depicted as having a chamber 6 and a piston 7. The motor chamber is pivotally mounted at 8 while the piston rod 9 is extended to and pivotally connected at 10 with the side lever 2. Operating pressure may be derived from a suitable source, such as the intake manifold 11 of the

2 vehicle to which the motor is connected by a suction line 12, a control valve 13, and a pair of branch passages 14. The branch passages enable selective communication between the source and the opposite ends of the motor, the unconnected end being vented to the atmosphere.

To control the final portion of the top raising movement against violent impact upon the windshield, with possible damage to the vehicle and also personal injury, means are provided to retard the descent of the top to its final position. Such means are designed to permit free and unobstructed folding of the top. In the illustrated embodiment, the piston is formed with an auxiliary chamber 15 which may extend into the piston rod and which may be completely filled but preferably is only partially filled with a hydraulic fluid 16. Within this auxiliary chamber is arranged a variable sized plunger having a body 17 which is anchored to the bottom wall of the motor chamber by a stem 18, and is of a size to permit free flow of liquid thereby. The plunger also embodies a size increasing ring or valve 19 which is free and independent of the body 17 but cooperable therewith to provide a prescribed clearance thereabout for restricting the escape of liquid thereby. A spring 20 serves to yieldably support the clearance providing ring at the proper height for engaging the plunger body 17 and cooperating therewith in timely retarding the motor with respect to the top descending movement. This retarding action will bring the forward edge of the top gently down upon the windshield in a safe and quiet manner, the spring yielding as the piston rod continues its upward travel following the flow restricting contact between the ring and the body. Until this moment the liquid flow will be relatively free about the body 17 and through the ring 19. However, as soon as the ring seats upon the underside of the body the fluid flow will be confined to the clearance between the ring and the surrounding chamber wall.

When it is desired to fold the top structure into its storage space, the valve 13 is moved accordingly to apply suction to the underside of the piston 17 whereupon the latter will descend and the clearance ring will open the freer channel through the ring for easier flow. Consequently, the folding action will be rapid and under the full energy output of the motor.

The mechanism is simple and durable. The control of the top raising movement will ease the impact between the top and the windshield without hindering the folding operation. The clearance ring serves in a valving capacity to restrict the normal free clearance around the plunger body. The normal clearance may be provided by a passage of any suitable form and therefore the clearance restricting member 19 may likewise be of a suitable cooperative form for accomplishing the retarding function.

The action is efficient and practical, and while the foregoing description is given in detail it is without thought of limitation since the inventive principles involved are capable of assuming other physical embodiments without departing from the spirit of the invention and the scope of the appended claims.

What is claimed is:

1. Means for extending the collapsible top of a convertible automobile from a folded position to an operative position with the forward portion thereof swinging upwardly and then downwardly upon the vehicle windshield, comprising a pneumatic motor for extending and folding the top and including a chamber and a piston therein with one of the motor elements having an auxiliary chamber and the other motor element carrying a plunger with yielding valving means adapted to engage the plunger for restricting the fluid movement from one side of the plunger to the opposite side thereof for retarding the motor during its top extending stroke, said valving means adapted to disengage the plunger during the top folding movement for freely permitting the motor to operate during its top folding stroke.

2. Means for extending the collapsible top of a convertible automobile from a folded position to an operative position with the forward portion thereof swinging upwardly and then downwardly upon the vehicle windshield, said means comprising a pneumatic motor having a chamber element and a piston element, one of said elements being formed with an auxiliary chamber freely receiving a plunger body connected to the companion element, and a size increasing ring cooperating with the plunger body during the final portion of the top extending stroke to increase its size for providing a predetermined clearance thereabout sufficient to retard the final portion of the top extending movement of the motor.

3. Means for extending the collapsible top of a convertible automobile from a folded position to an operative position with the forward portion thereof swinging upwardly and then downwardly upon the vehicle windshield, comprising a pneumatic motor connectible to a top for extending and folding the same, said motor having a chamber and a piston with an auxiliary liquid containing chamber formed in said piston and a plunger body anchored to the motor chamber and movable in the auxiliary chamber for free fluid movement thereby, a clearance ring having a prescribed clearance thereabout for restricted fluid movement thereby and cooperable with the plunger body for otherwise sealing the clearance about the body.

4. Means for extending the collapsible top of a convertible automobile from a folded position to an operative position with the forward portion thereof swinging upwardly and then downwardly upon the vehicle windshield, said means comprising a pneumatic motor having a chamber element with a piston element therein, a liquid dash pot having a chamber provided on one of said elements and freely receiving a plunger body connected to the companion element, a normally open valve providing unrestricted liquid flow in bypass relation to the plunger to permit folding of a connected top, and means supporting the valve for cooperating with the plunger during the final portion of the top extending stroke to restrict the liquid flow for retarding the top extending stroke in its final portion.

5. Means for extending the collapsible top of a convertible automobile from a folded position to an operative position with the forward portion thereof swinging upwardly and then downwardly upon the vehicle windshield, said means comprising a pneumatic motor having a chamber with a piston therein, the chamber being mounted upon a fixed support and the piston having an upwardly extending rod for connection to the folding top, the lower end of the rod being tubular to form a dash pot chamber, a plunger carried by the motor chamber and extending through the piston into the dash pot chamber with a liquid tight fit, the lower end of the dash pot chamber containing a liquid body into which the upper end of the plunger moves during the top extending stroke of the motor, and a resiliently mounted valving ring encircling the plunger beneath its upper end and engageable by the latter upon its movement into the liquid body for restricting the clearance about such upper end during the top extending stroke for imposing a drag during the final portion thereof while yielding from such upper end upon the reverse stroke to relieve the pneumatic motor from such drag.

ANTON RAPPL.

REFERENCES CITED

The following references are of record in the file of this patent:

UNITED STATES PATENTS

| Number | Name | Date |
|---|---|---|
| 1,926,757 | Tendero | Sept. 12, 1933 |

FOREIGN PATENTS

| Number | Country | Date |
|---|---|---|
| 475,815 | Great Britain | Nov. 25, 1937 |